United States Patent
McIntyre et al.

(10) Patent No.: US 10,144,149 B2
(45) Date of Patent: Dec. 4, 2018

(54) STIFF MYCELIUM BOUND PART AND METHOD OF PRODUCING STIFF MYCELIUM BOUND PARTS

(71) Applicants: Gavin R. McIntyre, Troy, NY (US); Greg Tudryn, Cohoes, NY (US); Jeff Betts, Troy, NY (US); Jacob Winiski, Troy, NY (US)

(72) Inventors: Gavin R. McIntyre, Troy, NY (US); Greg Tudryn, Cohoes, NY (US); Jeff Betts, Troy, NY (US); Jacob Winiski, Troy, NY (US)

(73) Assignee: Ecovative Design LLC, Green Island, NY (US)

( * ) Notice: Subject to any disclaimer, the term of this patent is extended or adjusted under 35 U.S.C. 154(b) by 464 days.

(21) Appl. No.: 14/336,385

(22) Filed: Jul. 21, 2014

(65) Prior Publication Data

US 2015/0038619 A1    Feb. 5, 2015

Related U.S. Application Data

(60) Provisional application No. 61/860,386, filed on Jul. 31, 2013.

(51) Int. Cl.
*B27N 3/00* (2006.01)
*B27N 3/20* (2006.01)
*B27N 3/24* (2006.01)
*B27N 3/02* (2006.01)
*B29K 105/00* (2006.01)

(52) U.S. Cl.
CPC ............. *B27N 3/002* (2013.01); *B27N 3/005* (2013.01); *B27N 3/20* (2013.01); *B27N 3/24* (2013.01); *B27N 3/02* (2013.01); *B29K 2105/251* (2013.01); *B29K 2105/256* (2013.01)

(58) Field of Classification Search
None
See application file for complete search history.

(56) References Cited

U.S. PATENT DOCUMENTS

2009/0307969 A1 * 12/2009 Bayer .................... A01G 1/046
47/1.1

OTHER PUBLICATIONS

The Mineral Gypsum, pp. 1-4, retrieved from the internet, 2015: www.minerals.net/mineral/gypsum.aspx.*

* cited by examiner

*Primary Examiner* — Renee Claytor
*Assistant Examiner* — Evelyn Y Pyla
(74) *Attorney, Agent, or Firm* — Francis C. Hand; Carella, Byrne, et al

(57) ABSTRACT

A self-supporting composite body comprising a substrate of discrete particles and a network of interconnected mycelia cells extending through and around the discrete particles and bonding the discrete particles together is characterized in being stiff and in having a density of greater than 18 pounds per cubic foot (pcf). The method of making the composite body includes compressing a mass of biocomposite material comprised of discrete particles and a network of interconnected mycelia cells in the presence of moisture into a compressed body having a density in excess of 18 pcf. Compression may take place batch wise in a press or continuously between a pair of movable endless conveyors.

2 Claims, 2 Drawing Sheets

STIFF MYCELIUM BOUND PART AND METHOD OF PRODUCING STIFF MYCELIUM BOUND PARTS

This application claims the benefit of Provisional Patent Application 61/860,386, filed Jul. 31, 2013.

This invention relates to a stiff mycelium bound part and to a method of producing stiff mycelium bound parts. More particularly, this invention relates to a method of producing stiff mycelium bound parts using compression.

As is known, conventional methods for producing nonstructural boards rely on compressing wood veneer sheets, fibers, or particles and binding them together with resin to form composites like hardwood plywood and medium density fiberboard, which are used for applications such as furniture and fixtures, cabinetry, paneling, and molding. The ingredients for these typical non-structural boards require considerable pre-processing, and the feedstocks, especially timber and resins, are subject to considerable price volatility. Additionally, many of the resins used to produce non-structural boards are carcinogenic and can emit volatile organic compounds (VOCs).

Much like nonstructural boards, structural boards are produced by compressing wood veneer sheets, fibers, or particles and binding them together with resin to form composites like oriented strand board (OSB) and softwood plywood. OSB and softwood plywood are used for applications such as wall sheathing, floor sheathing, and concrete framework. These structural boards face the same concerns that nonstructural boards face because they use similar feedstocks and resins.

Many structural and nonstructural boards are used for applications in furniture, cabinetry, and fixtures where they must be cut, milled, and sanded to form the desired shape. Such post processing is expensive and time consuming and creates material waste as the products are shaped. Plastics are also used for these applications and require expensive tools and machines for molding in their production processes.

US Published Patent Application 2008/0145577 describes various techniques for making self-supporting composite bodies comprised of discrete particles and a network of interconnected mycelium cells bonding the particles together. As described therein, the composite bodies may be formed into panels as well as into panel systems with a composite core.

It is an object of the invention to improve the structure of the composite bodies produced in accordance with the techniques described in US Published Patent Application 2008/0145577.

It is another object of the invention to provide a compressed composite body of particle/mycelium.

It is another object of the invention to provide a stiff composite body of particle/mycelium that can be used to make nonstructural boards and structural boards.

It is another object of the invention to provide molded bodies of particle/mycelium material.

Briefly, the invention provides an improved composite body and a method for improving the structure of the composite bodies produced in accordance with the techniques described in US Published Patent Application 2008/0145577.

The composite body is made of a self-supporting composite material comprising a substrate of discrete particles and a network of interconnected mycelia cells extending through and around the discrete particles and bonding the discrete particles together. In accordance with the invention, the composite body is characterized in being stiff, that is, in having a density of greater than 18 pounds per cubic foot (pcf).

The method of the invention involves compression of a biocomposite material composed of discrete particles and a network of interconnected mycelia cells bonding the discrete particles together in the presence of moisture into a compressed body having a density in excess of 18 pcf. Compression may take place batch wise, for example, in a press or mold or continuously between a pair of movable endless conveyors.

In accordance with the invention, the basic steps of the method include:

1. Obtain substrate constituents, including fungal inoculum, a bulking collection of particles and/or fibers, a nutrient source or variety of nutrient sources, and water.
2. Combine the substrate constituents by mixing together in volumetric or mass ratios to obtain a solid media with the inoculum (cell and/or tissue culture) added during or following the mixing process.
3. Place the growth media in an enclosure or series of enclosures of the desired geometry.
4. Allow the mycelia to grow through the substrate, creating a composite with a geometry matching the enclosure.
   a. Repeat steps 1-3 for applications where materials are layered or embedded to create the desired final composite media.

Alternatively to steps 3 and 4, the growth media may be grown as a solid mass, and then ground up for later steps or placed in an enclosure of the desired shape and then be allowed to regrow into that shape.

Typically, a self-supporting composite material fabricated as described in US Published Patent Application 2008/0145577 has a density of from 2.8 to 12 pounds per cubic foot (pcf).

In order to produce a stiffer composite material in accordance with the invention, the followings steps are performed:

5. Remove the composite from the enclosure and place in a mold or press of the desired shape that is capable of withstanding compression forces and can be fixed to hold its shape against outward internal pressure.
   a. The composite may be placed in the mold or press as a single piece, a variety of pieces, or a layered assortment of pieces.
   b. Alternatively, reground material may be placed in the mold or press instead of a shaped composite.
6. Compress the composite to the desired density and shape while adding moisture to the composite if not already present in the composite. Humidified air may be provided continuously or on a duty cycle to maintain fungal aerobic respiration.
7. Fix the mold or press to keep the composite in place allowing the mycelium to bind the particles together in their compressed configuration.
8. Remove the composite from the mold or press and kill the organism and dehydrate the composite, finishing the part.

Additional methods can also be used to produce desirable properties in the final composite. The density of the final composite is at least 18 pcf.

In another embodiment, the compressed composite material may be created through continuous compression. In this embodiment, sheets of colonized particles/fibers or a rough mass can be fed in between rollers that are angled to increase compression as the colonized substrate is pushed through.

Liquids and gases can be applied during the compression to enhance end material properties. The material ejected from the rollers can be dried with hot air to dehydrate the material and deactivate the fungus, leaving the final compressed biocomposite.

These and other objects and advantages of the invention will become more apparent from the following detailed description taken in conjunction with the accompanying drawings wherein.

Figure 1:
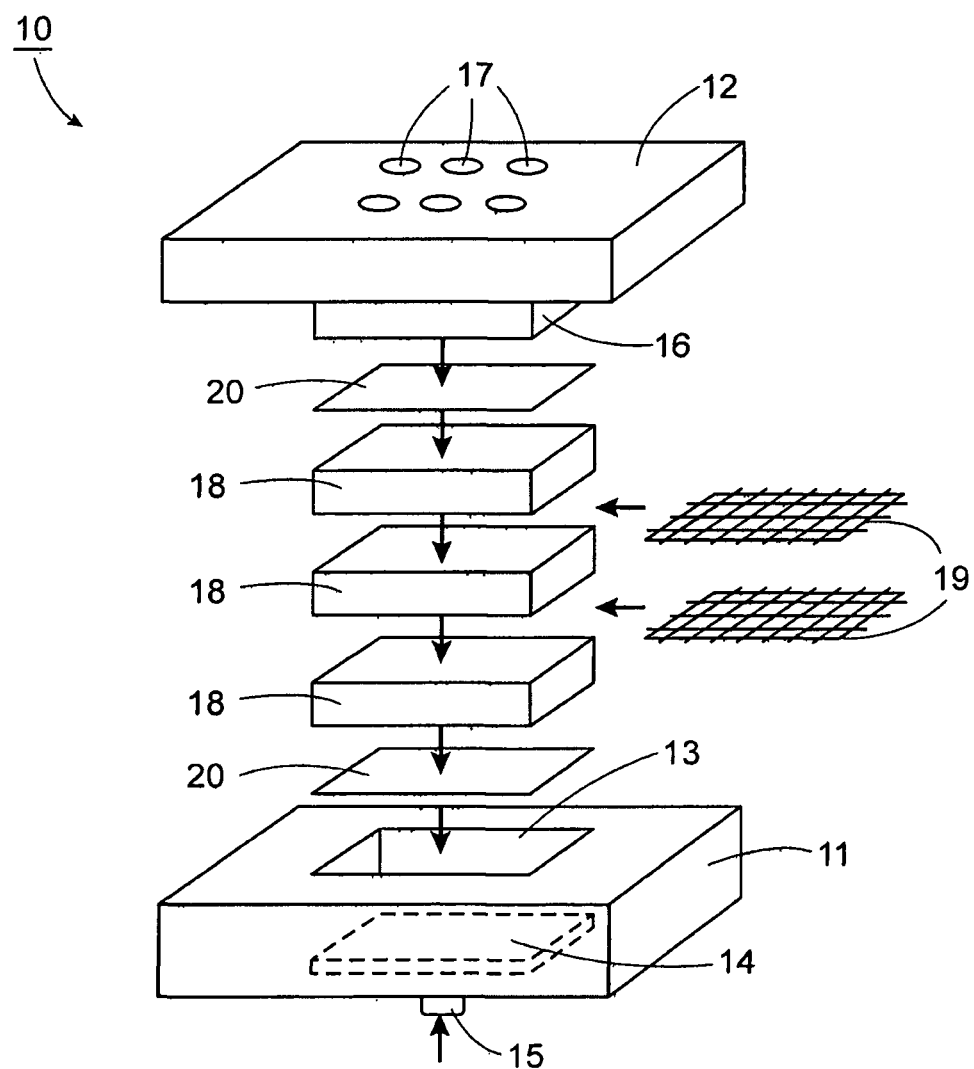
FIG. 1 illustrates as exploded view of a compression fixture for compressing composite bodies in accordance with the invention.

Referring to FIG. 1, the compression fixture 10 employs a bottom platen 11 and a top platen 12 that are movable relative to each other to compress material therebetween. The fixture 10 may be made of any suitable material, such as, aluminum or a composite material such as fiberglass.

The bottom platen 11 is illustrated as a rectangular block shape with a central cavity 13. In addition, a plenum 14 is located inside the platen 11 below and in communication with the cavity 13 as well as in communication with a supply line 15 for feeding gas into the plenum 14 and cavity 13.

The top platen 12 has a depending plunger 16 shaped complementary to the cavity 13 in order to fit into the cavity 13 when the platens 11, 12 are brought together. The top platen 12 also has a plurality of bores 17 that pass completely therethrough to communicate with the cavity 13 to allow active or passive aeration.

In the illustrated embodiment, in order to form a compressed composite body, the cavity 13 of the bottom platen 12 of the compression fixture 10 is loaded with three composite bodies 18 of rectangular block shape corresponding to the shape of the cavity 13; each body 18 having been made in accordance with a method as described in US Published Patent Application 2008/0145577. That is, each body 18 is a self-supporting composite body comprised of discrete particles and a network of interconnected mycelium cells bonding the particles together.

In addition, laminates 19 are placed in alternation with the bodies 18. Each laminate 19 may be of any suitable material, such as a woven textile, for imparting a desired characteristic to the final product.

Also, air permeable laminates 20 are placed in the cavity 13 as the first and last layers to contact the exterior surfaces of the stacked bodies 18. In addition to allowing the passage of air and gases or fluids, each laminate 20 may have a surface facing a body 18 for imparting a desired surface feature to the final product. These laminates 20 serve as plenums which distribute the air flow across the surface area of the bodies 18 and are not intended to become part of the final product.

Figure 2:
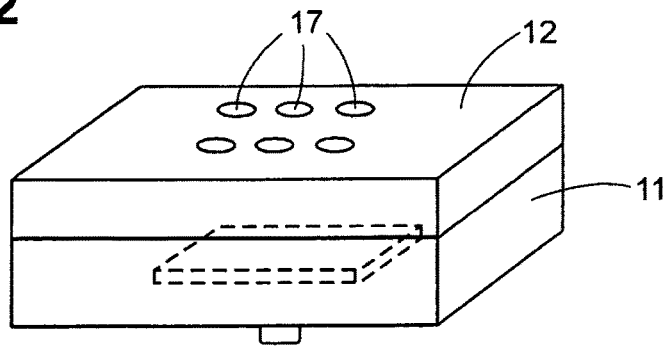
FIG. 2 illustrates a view of the fixture of FIG. 1 upon completion of compression.
Figure 3:
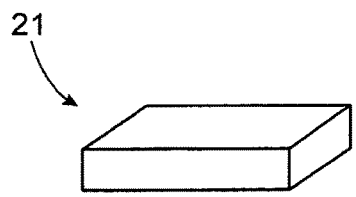
FIG. 3 illustrates a schematic view of a compressed composite body in accordance with the invention.

After filling the cavity 13 with the stacked bodies 18 and laminates 19, 20, the platens 11, 12 are brought together as indicated in FIG. 2 to compress the stacked bodies 18 and laminates 19 together into a cohesive mass characterized as a one-piece monolithic body 21 (see FIG. 3). During this time, should the bodies not have a residual moisture content, moisturized air is pumped through the supply line 15 into the cavity 13 to simulate growth of the mycelium. In this respect, the combination of pressure, active aeration and moisture causes the mycelia of the individual bodies 18 to grow through the interior laminates 19 into the adjacent body 18 thereby bonding the stacked bodies 18 and laminates 19 together in the manner of a glue or adhesive.

In order to prevent the mycelia of the outermost bodies 18 from growing into the air permeable laminates 20, a film release agent, such as a Tyvek® sheet, that is permeable to water vapor and air but which traps condensed water in the product being compressed, is placed between a body 18 and a permeable laminate 20. This allows the final part to disconnect from the air permeable layer 20 while still adding air and water vapor. The air permeable laminates 20 can then be reused in the fabrication of additional products.

The platens 11, 12 are maintained closed on each other for a time sufficient to incubate the mycelia under pressure for from 3 to 5 days.

After incubation is completed, the platens 11, 12 are moved apart and the compressed monolithic body 21 removed. As indicated in FIG. 3, the compressed body 21 has a smooth peripheral outer surface so that there is no demarcation of the original bodies 18.

Should the platens 11, 12 have surfaces facing the bodies 18 for embossing the final product, the embossment of the outer bodies 18 will occur during compression and incubation.

In any event, the compression fixture 10 produces a final part that does not require flash removal.

Additional steps may be used to produce desired properties in the compressed monolithic body 21.

Where the compression fixture 10 is located in a surrounding incubation environment, a partial pressure of oxygen, or other functional gases, in the surrounding incubation environment can be elevated to passively drive the gas into the composite body 21.

II. Gelling agents may be used to increase the strength and stiffness of the final composite.
 a. Gelling agents, such as xanthan gum and psyllium seed husks, may be added into the substrate at step 2 above, during regrinding if that method is undertaken, or directly prior to compression.
III. Chemical and nutritional stimulants can be used to alter the growth characteristics of the mycelium to alter growth time or final mechanical properties.
 a. Chemical and nutritional stimulants, such as starches, vitamins, and bacteria, may be added into the substrate at step 2 above, during regrinding if that method is undertaken, or directly prior to compression.
IV. The composite can be soaked in water or another liquid to increase stiffness, strength, and/or density of the final product.
 a. The composite may be soaked prior to compression, during compression, or after compression.
V. The composite can be allowed to continue growing after removal from compression to increase stiffness, strength, and/or density of the final product.
VI. The composite may be imprinted with a surface, before, during, or after compression to modulate surface finish.
VII. Grown materials produced with different substrate blends, i.e. wood fibers versus coffee grounds, may be layered together prior to compression to create a composite that has a core and surface with different properties or a composite with layers of different properties. This may improve the surface finish of a stiff, but rough part, or provide flexibility without creating a large reduction in stiffness.

VIII. Materials such as wooden veneers, woven or non-woven fibers, metal sheets (solid or expanded), porous stone, and/or plastics may be embedded into the material by adding them prior to compression. This may improve properties such as flexibility, stiffness, strength, or screw withdrawal load.
   a. These materials can be added to an external surface, an interface between layers, or be driven into the composite.

IX. Pure mycelium that does not contain particulate matter can also be added to the material prior to compression and grown into the composite during compression to create a tough skin. This may improve properties such as flexibility, stiffness, strength, or screw withdrawal load.
   a. Pure mycelium can be added to an external surface or interface between layers.

X. Metal salts ($CaCl_2$, $Al_2O_3$, or the like) can be intermixed with the constituents detailed in Step 1. The fungal mycelium will not digest these metal salts, but rather, the salts will adhere to carboxyl and phosphoryl functional groups on the exterior of the fungal cell wall. The metal salt concentration can modulate the electrical conductivity of the mycelium based composite, which is naturally dielectric, to allow for the electrodeposition (spray coating) of other metals, paint, or surface treatments.

XI. Compressed composite parts can be dipped in water or gelling agent mixture, such as xanthan gum in water, and then dried with a smooth material pressed into each side. This can produce a flatter, smoother surface finish.

In other embodiments, a single body 18 of suitable thickness may be compressed in the compression fixture.

The production requires very little energy as the fungus does most of the work by growing and binding particles and fibers together with energy the fungus has gained metabolizing the particles and fibers and any nutritional supplements without any active inputs.

Because of the ability to use waste materials and a low energy biological production process, the resulting composite material 21 inherently has a low carbon footprint and is biodegradable. In contrast to some other composite materials, the use of fungal mycelium as a binding agent instead of compounds, such as urea formaldehyde, which may be carcinogenic and emit volatile organic compounds, provide an environmentally friendly method of making compressed products.

The degree of compression of a composite body 18 into a compressed composite body 21 may vary depending on the desired result. In accordance with the invention, a composite body 18 is compressed to approximately 3 times density. Because the composite body 18 is not characterized in being resilient, such as a foamed thermoplastic polymer material, such as polystyrene, polyurethane and the like, the compressed shape is retained.

By way of example, a compressed composite body 21 when made as described above is a self-supporting composite material comprising a substrate of discrete particles and a network of interconnected mycelia cells extending through and around the discrete particles and bonding the discrete particles together. In accordance with the invention, the compressed composite body 21 is characterized in being stiff, that is, in having a density of greater than 18 pounds per cubic foot (pcf). In particular, the composite body 18 has a density in the range of from 19 pounds per cubic foot (pcf) to 65 pcf.

The following examples are provided to further describe the invention.

EXAMPLE 1

1. Corn stover, maltodextrin, calcium sulfate and water are mixed in an autoclavable bag to form the substrate for fungal growth.
2. The bag is sterilized in a pressure cooker at 15 psi and 240° F. for 60 minutes.
3. Millet grain spawn containing fungal tissue is mixed into the substrate.
4. Plastic tool molds that are 6 inches long, 6 inches wide, and 1 inch deep are filled with inoculated substrate.
5. The substrate is allowed to colonize in the tools for 7 days at ambient laboratory conditions (75° F., 20% relative humidity, 2000 ppm $CO_2$).
6. Wooden veneers that are 6 inches wide by 6 inches long and a square of porous plastic with same dimensions are soaked in 10% hydrogen peroxide for 30 minutes.
7. The substrate tiles (bodies 18) are ejected from the mold and stacked in groups of three with a wooden veneer (laminate 20) at each surface and interface and the porous plastic square on the side that will be next to the supply line 15 during compression, i.e. on an underside of the stack.
8. The stack of tiles, veneers, and porous plastic is compressed to approximately 3 times density in a compression frame with an air inlet for forced aeration on one side and holes for passive ventilation on the other.
9. The compression frame is hooked up to an air pump and the compressed substrate is subjected to forced aeration for 5 days.
10. The compressed part (31 supra) is ejected from the compression frame and allowed to overgrow for 3 days.
11. The part is dried at 180° F. for 8 hours.

The resulting part has a screw withdrawal force of 62 pound-feet (lbf) as compared to the approximately 20 lbf screw withdrawal force of similar parts that do not use veneers.

EXAMPLE 2

1. Corn stover, maltodextrin, calcium sulfate and water are mixed in an autoclavable filter-patch bag to form the substrate for fungal growth.
2. The bag is sterilized in a pressure cooker at 15 psi and 240° F. for 60 minutes.
3. Millet grain spawn containing fungal tissue is mixed into the substrate.
4. The substrate is allowed to colonize in the filter patch bag for 7 days.
5. The colonized substrate is then reground and packed into plastic tool molds that are 6 inches wide, 6 inches long, and 2 inches deep.
6. The substrate is allowed to colonize in the tools for 5 days at ambient laboratory conditions (75° F., 20% relative humidity, 2000 ppm $CO_2$)
7. The substrate tiles are ejected from the mold.
8. A 6 by 6 inch square of porous plastic is placed on the side of the tile that will be near the air inlet during compression and the stack is compressed to approximately 4 times density in a compression frame with an air inlet on one side and holes for passive aeration on the other.

9. The compression frame is submerged in water for 4.5 hours, allowing the compressed substrate to become saturated with water.
10. The compression frame is removed from the water and hooked up to an air pump and the compressed substrate is subjected to forced aeration for 5 days.
11. The compressed part is ejected from the compression frame and allowed to overgrow for 3 days.
12. The part is dried at 180° F. for 8 hours.

The resulting part had a modulus of elasticity of 8430 pounds/square inch (psi) and a flexural strength of 222 psi, exceeding the modulus of elasticity of 6640 psi and flexural strength of 172 psi displayed by a part produced in the same manner but without the soaking step.

Figure 4:
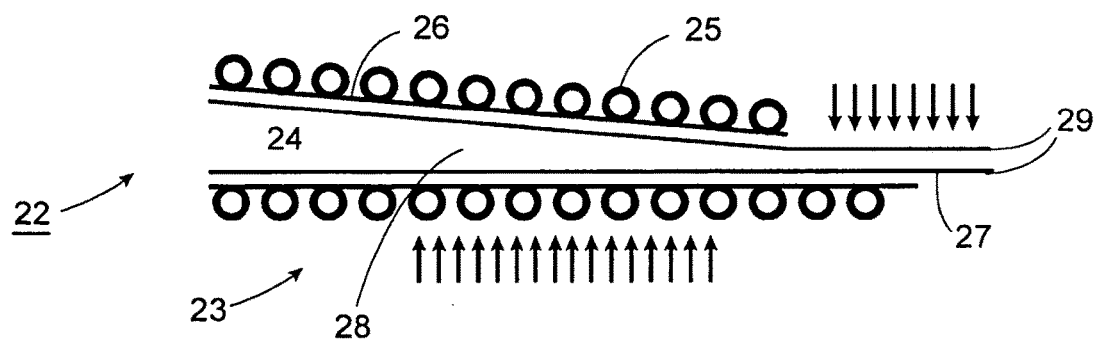
FIG. 4 schematically illustrates a compression fixture for the continuous compression of composite bodies in accordance with the invention.

Referring to FIG. 4, wherein like reference characters indicate like parts as above, the compression fixture 22 for the continuous compression of composite bodies includes a horizontally disposed continuous conveyor 23 having an endless belt 24 with a smooth continuous upper surface and an angularly disposed continuous conveyor 25 having an endless belt 26 with a smooth continuous lower surface facing the horizontally disposed conveyor 23 to form a space of narrowing height to an outlet 27 of predetermined height.

When the compression fixture 22 is in use, mycelium bound particles or fibers 28 (hereinafter "the biocomposite material") are placed in the compression fixture 22 in sheets, agglomerated particles, or a combination thereof. In these cases, the biocomposite material has a residual moisture content of from 60% to 65% by mass or moisture is added.

One embodiment entails the use of flat sheets of plastic 29, or analogous flat sheet materials that offer sufficient rigidity for compression, that are used to compress the biocomposite material 28 between the conveyors 23, 25. For example, as illustrated, one flat sheet 29 is laid over the endless belt 24 of the lower conveyor 23 at the input end to be conveyed therewith, the biocomposite material 28 is deposited onto the sheet 29 and the second sheet 29 is laid over the biocomposite material 28 to separate the biocomposite material 28 from the surface of the endless belt 26 of the upper conveyor 25.

Where flat sheets 29 are used, the endless belts 24, 26 of the conveyors 23, 25 need not be smooth. For example, the flat sheets 29 may have embossments for applying a sculptured surface to the compressed body 21. Also, each of the pair of flat sheets 29 is air permeable for passage of air, gas and/or fluids, e.g. water, therethrough.

The moist (greater than 10% by mass) biocomposite material 28 is compressed to the desired thickness as the material is conveyed to the outlet 27 of the compression fixture 22 and issues as a compressed composite body 21.

The compression fixture 22 includes a heating means 30 downstream of the outlet 27 for heating of the compressed composite body 21. In this respect, the heating means 30 may be of a type to inject dry hot air or other gas through the composite body 21 for an interval of time to remove remaining moisture and to inactivate the mycelium (fungus).

The compression fixture 22 also includes a fluid injection means 31 located below and along the lower conveyor 23 for injecting a liquid or gaseous water (i.e. water in liquid or vapor form) or other fluid including air into the biocomposite material 28 during compression thereof. In this respect, the endless belt 24 and the flat sheet 29 thereon are porous to the passage of the fluid or gas medium into the biocomposite material 28.

During the continuous process, various modifications may be made. For example:

i. Micronutrients, metal salts, and or reinforcing fibers can be applied at the front end of the compression process ii. The biocomposite material 28 can be soaked in water in advance of the compression process, or misted with water during the continuous incubation cycle.

In another embodiment, similar to a traditional progressive die process, the biocomposite material 28 can be compressed and released at intervals until the biocomposite material 28 achieves the desired thickness and/or form.

The methods described within explain the practices and materials that may be used to produce stiff composites by compressing a mass of discrete particles that have been bound together with fungal mycelium. Many discrete particles, including a variety of forms of agricultural waste, can be bound together with mycelium and compressed to create a stiff bio-based and biodegradable material that could fulfill a variety of structural roles.

The resulting composites may be used for applications that currently employ media requiring costly ingredients and binding agents that release carcinogens and volatile organic compounds. Additionally, the parts will be easily capable of being formed into molded shapes, while currently used materials are expensive to shape, often needing to be cut and milled, creating unnecessary waste.

The invention has a number of advantages over the wood, engineered wood, and plastics that currently dominate these application areas. Unlike wood, engineered wood, and plastics, the composite material is not strongly tied to scarce resources with volatile prices such as timber and crude petroleum. Instead, the invention can utilize feedstocks such as agricultural waste, which is cheap and continuously and readily available.

Wood, engineered wood, and plastics require significant pre-processing of feedstocks before they can be used in the final production process. The invention provides a method and composite material that requires little preprocessing in its main feedstocks of particulate and/or fibrous matter and fungal inoculum.

By creating sheets of material made from particles bound together with mycelium and compressing these sheets together, one can create biobased nonstructural boards with feedstocks. Additionally, VOCs are not a concern for structural boards produced in this manner because no VOC emitting resins are used in the production process.

There are significant mechanical advantages garnered from layering and compressing sheets of mycelium bound particles into a single cohesive product. These advantages include enhanced screw hold strength in which the sheet interfaces further resist fastener withdrawal, and the ability to layer sheets of varying particles size to achieve greater stiffness or dimensional stability (squareness, flatness). Other materials, including veneers, textiles, or laminates, that are comprised of wood, plastics, foam, natural fibers, stone, metal, or the like can be grown and bound to the face or internal structure of the mycelium and particle sheets. These laminates can be stacked and interlaid to the mycelium colonized particle sheets, and then compressed to a desired form (flat or molded).

Alternatively, thicker blocks of grown material can be compressed to form the boards instead of layered sheets.

Structural boards can be created by compressing thick blocks of grown material or layered sheets of grown material (particles and/or fibers bound by mycelium) to create a bio-based product that does not emit VOCs.

Unlike currently used materials, the compressed composite material can be easily and cheaply shaped during production process. The grown material can be compressed in an inexpensive mold (fiberglass, wooden and/or metal frame), giving the material the desired shape and material properties without creating waste.

The invention provides a way to utilize agricultural waste and similar materials with a different binding agent to create novel composite materials that use a totally different production process to drastically reduce the environmental impact of fabrication.

What is claimed is:

1. A self-supporting composite body comprising a substrate of discrete particles and a network of interconnected mycelia cells extending through and around the discrete particles and bonding the discrete particles together, said composite body being characterized in being stiff, in having a density of greater than 18 pounds per cubic foot (pcf) and in having a modulus of elasticity of at least 6640 psi and a flexural strength of at least 172 psi.

2. A self-supporting composite body comprising a substrate of discrete particles and a network of interconnected mycelia cells extending through and around the discrete particles and bonding the discrete particles together, said composite body being characterized in being stiff, in having a density of greater than 18 pounds per cubic foot (pcf) and in having a modulus of elasticity of 8430 psi and a flexural strength of 222 psi.

* * * * *